United States Patent [19]

Dobrzanski et al.

[11] 3,934,145

[45] Jan. 20, 1976

[54] IONIZATION SMOKE DETECTOR AND ALARM SYSTEM

[75] Inventors: John Dobrzanski, New Britain; Ernest V. Hart, West Hartford, both of Conn.

[73] Assignee: Emhart Corporation, Farmington, Conn.

[22] Filed: Oct. 25, 1973

[21] Appl. No.: 409,647

[52] U.S. Cl. .................. 250/381; 250/389; 313/54
[51] Int. Cl.² .......................................... G01T 1/18
[58] Field of Search ......... 250/381, 389; 340/237 S; 313/54

[56] References Cited

UNITED STATES PATENTS

| | | | |
|---|---|---|---|
| 3,460,124 | 8/1969 | Smith et al. | 340/237 S |
| 3,681,603 | 8/1972 | Scheidweiler et al. | 250/381 |
| 3,767,917 | 10/1973 | Lampart et al. | 340/237 S |

*Primary Examiner*—Archie R. Borchelt
*Attorney, Agent, or Firm*—McCormick, Paulding & Huber

[57] ABSTRACT

An ionization smoke detector particularly suited to residential use is disclosed. The detector is battery-operated and is connected with a non-latching, pulsating alarm circuit. The detector has a sensing chamber formed by a perforated metallic shell and an electrode within which an insulated radiation source is centrally positioned to generate an ionization current for detecting smoke or other similar aerosols. The alarm circuit provides a pulsating alarm signal when smoke levels above a predetermined value are sensed. The alarm circuit also includes a low voltage detection circuit for sounding the alarm when the end of useful battery life is approaching.

13 Claims, 7 Drawing Figures

IONIZATION SMOKE DETECTOR AND ALARM SYSTEM

CROSS-REFERENCE TO RELATED APPLICATION

The subject matter disclosed and illustrated in this application is related to subject matter in a copending design application Ser. No. 409,283, filed Oct. 24, 1973 by the same Assignee and entitled Smoke Detector or the Like.

BACKGROUND OF THE INVENTION

The present invention relates to an ionization smoke detector connected to an alarm circuit triggered by a sensor in the detector when a predetermined smoke level is exceeded. The detector has particular utility as a fire detector in residences since it is battery-operated and the alarm circuit provides warnings for both fires and approaching weak battery conditions.

Ionization smoke detectors such as shown in U.S. Pat. No. 3,728,706, are already well known in the art. Such detectors operate upon the principle that an ionization current catalyzed by a radiation source is affected by the presence of particulate matter such as that found in aerosols or smoke emanating from a fire. The particulates reduce the ionization current and such a reduction in current can be detected and correlated with the density of the particulate matter to provide a fairly accurate indication of a smoke condition.

It is desirable to operate such a detector with a battery, especially in residential homes and apartments. To provide a prominent alarm signal, a pulsating circuit energized by the battery may be triggered by the smoke detector. A pulsating circuit reserves battery strengths so that the alarm may continue for an extended period of time even after the life of the battery is partially expended.

In view of the reliance that may be placed upon a smoke detector, particularly in a residential environment, safety considerations must be given careful consideration. The limited life of a battery might suggest that it is not suitable for an alarm device; however, it is also recognized that fire can destroy or cut off outside electrical sources before the fire is detected. The battery-operated system functions independently and can be safely relied upon if it includes low-voltage detection circuitry for sounding the alarm when the battery level is approaching a weakened or marginal condition.

It is, accordingly, a general object of the present invention to disclose a battery-operated ionization smoke detector connected to an alarm circuit possessing features insuring safe operation in the residential environment.

SUMMARY OF THE INVENTION

The present invention resides in a battery-operated ionization smoke detector and its alarm circuitry forming a reliable smoke alarm system. The smoke detector has a sensing chamber comprised of a perforated metallic shell supported at one side on a mounting board. An electrode is mounted on the board and positioned within the open interior space of the metallic shell in electrically insulated relationship with the shell. The electrode has a surface facing away from the board and toward the shell so that an electrical field can be generated in the interior space of the shell when the shell and electrode are connected to the respective poles of the battery. The electrode defines an aperture in the middle of the surface facing the interior space and a radiation source is supported from the mounting board in the aperture for exposure within the metallic shell.

The radiation source produces alpha particles which impinge upon atoms to release electrons within the interior space of the shell and to generate an ionization current when the electrode and shell are operatively connected to a battery. Smoke particles or other particulate matter in aerosols reduce the ionization current and effectively increase the resistance of the sensing chamber. The increased resistance can be detected in an electrical alarm circuit connected to the chamber and an alarm is triggered whenever a predetermined level of smoke or other particulate matter is exceeded.

The alarm circuit employs a high impedance coupling means, such as a metal-oxide-semiconductor field-effect transistor, MOSFET, to sense the resistive changes in the sensing chamber and trigger a switching device in the alarm circuit to turn the alarm on. Deactivating means resets the switching device and shuts the alarm off a predetermined time after the alarm is turned on and recycling means including the coupling means again triggers the switching device to turn the alarm on an interval after the alarm is turned off, provided that the sensing chamber still detects the smoke condition. Such alarm circuitry and sensing chamber, therefore, form a non-latching, pulsating alarm system in which the alarm signal continues in an on-and-off pattern until the system is shut off or the smoke condition disappears.

As a safety measure, the battery-operated system includes a low-battery level detection circuit which is also connected to the alarm and set to sound the alarm before the battery strength reaches a level at which the alarm can no longer be operated with reasonable certainty.

In the preferred form of the invention, the mounting board for the sensing chamber is the printed circuit board defining the electrical circuitry of the alarm system. Solid state components are used throughout the system for compactness, accuracy, reliability and economy.

DESCRIPTION OF THE PREFERRED EMBODIMENTS

Figure 1:
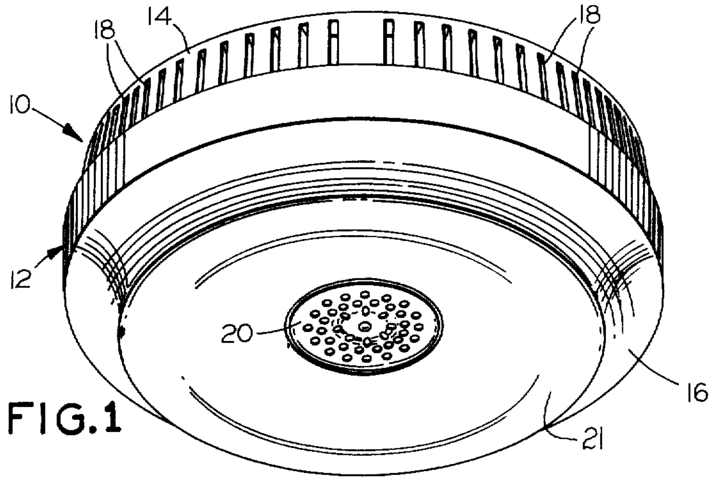
FIG. 1 is a perspective view showing the exterior of the ionization smoke detector of the present invention as it appears in a suspended condition when viewed from below.

FIG. 1 illustrates in a perspective view one form which the ionization smoke detector of the present invention may take. The detector has particular utility as a residential fire alarm system since it is battery-operated and is formed of components that can be easily assembled in a compact unit for installation on a wall or ceiling. FIG. 1 illustrates the appearance of the detector in a ceiling installation.

The detector, generally designated 10, has a housing 12 that can be injection-molded from a material such as polypropylene or can be stretch-formed from metal, such as aluminum, for attractive appearance in the home environment. The housing has a generally cylindrical shape and one exemplary embodiment having a six-inch diameter readily accommodates all of the components needed to form a self-contained, independently operating fire alarm system.

The housing 12 is a two-piece item composed of a base 14 and a cover 16. Around the periphery of the base 14 are a plurality of apertures 18 or slots extending radially through the housing wall to provide complete communication between the ambient environment surrounding the detector and the interior portions of the detector. The cover 16 has a central aperture through which a ventilated sensing chamber 20 is exposed. It will be understood that smoke or other aerosols will pass freely in and out of the housing 12 through the apertures 18 and through the apertures illustrated in the sensing chamber 20.

The peripheral wall 17 of the base 14 is sloped and diverges away from the flat bottom 19 to capture smoke at the apertures 18 when the detector is mounted flush against a wall or ceiling. The cover 16 has a concave surface 21 disposed generally parallel to the flat bottom 19 and surrounding the aperture exposing the sensing chamber 20 to capture smoke in a ceiling installation and direct the smoke to the chamber.

Figure 3:
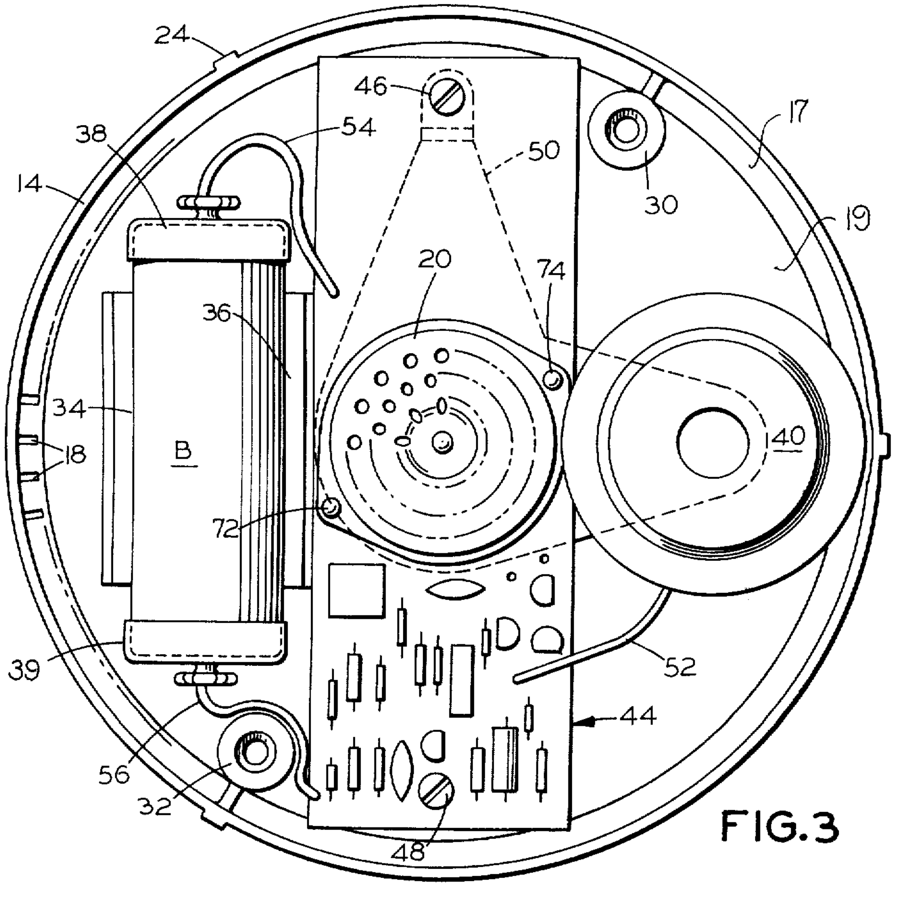
FIG. 3 is a top plan view of the detector as shown in FIG. 2 with the upper portion or cover of the housing removed to expose the interior components.
Figure 4:
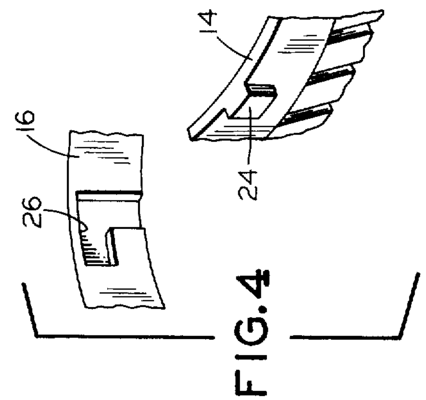
FIG. 4 is two fragmentary views of the mating locking tangs and grooves in the housing which permit the base and cover of the housing to be locked and unlocked for access to the interior components of the detector.

The base 14 and the cover 16 are held together by any suitable means; however, in a preferred embodiment of the detector, mating tangs 24 and grooves 26 shown in FIGS. 3 and 4 in the base 14 and cover 16 respectively are utilized to form a convenient twist lock for installing and removing the cover 16. Access to the interior of the housing is, therefore, made relatively simple.

Figure 2:
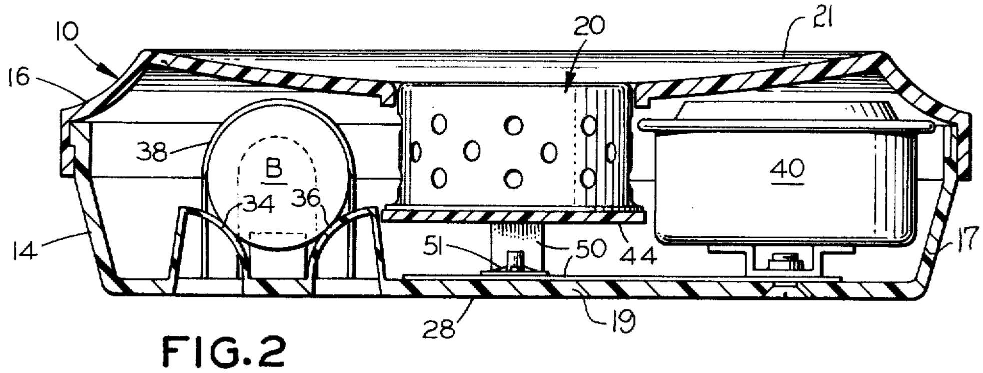
FIG. 2 is a side elevation view of the smoke detector in cross-section and shows the detector resting on the mounting surface of the housing base.

As shown in FIGS. 2 and 3, the base 14 has a flat external mounting surface 28 and a set of mounting bosses 30 and 32 projecting inwardly from the bottom 19 for attaching the detector 10 to a wall, ceiling or other fixture where the detector would be exposed to smoke emanating from a fire. The base 14 also serves as the structure to which each of the internal components of the detector are fastened. For example, the battery B is supported on a pair of resilient brackets 34 and 36 which, as illustrated, can be made as integral portions of the base. Battery holders 38 and 39 can also be molded integrally in the base with sufficient flexibility to spread slightly as a battery is removed or inserted. Together with the brackets 34 and 36 the holders capture the battery securely and permit installation and removal.

The alarm 40 is also connected to the base and can take the form of a horn, bell, buzzer or any other device which will produce an audible warning sound. It is also possible to incorporate in the detector a visual warning device which is operated jointly with the alarm 40.

Mounted in the center of the base 14 are the principal functional components of the detector including a sensing chamber 20 and the alarm circuit embodied in a printed circuit board 44. The chamber 20 is mounted directly on the circuit board 44 and the board 44 is mounted on bosses (not shown) in the base by means of the screws 46 and 48. A conductive grounding shield 50 held in the base by a snap clip 51 extends from the housing of the alarm 40 to the cladding on the bottom side of the circuit board and a separate insulated lead 52 extends between the interior of the alarm 40 and the printed circuit board 44. Leads 54 and 56 interconnect the battery and the circuit board on which the remaining electrical components of the alarm circuit are mounted.

Figure 6:
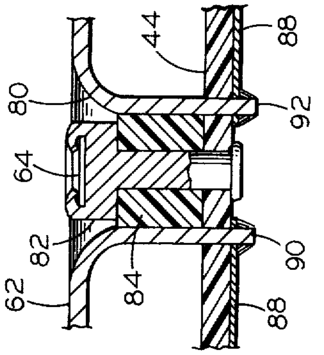
FIG. 6 is a fragmentary cross-sectional view showing details of the electrode and source mounting structure.
Figure 5:
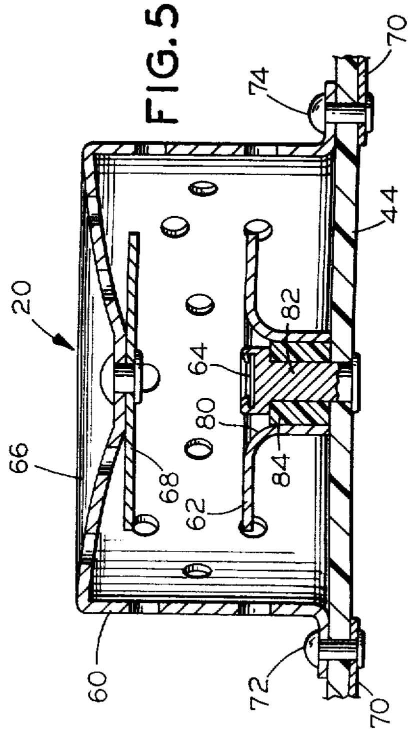
FIG. 5 is a fragmentary cross-sectional view of the sensing chamber shown in FIGS. 1–3.

FIGS. 5 and 6 illustrate the detailed structure of the sensing chamber 20 mounted on the printed circuit board 44. The sensing chamber is comprised primarily of a porous or perforated metallic shell 60 serving as an anode and exposed through the cover 16 in FIGS. 1 and 2, a ground electrode 62 and a radiation source 64.

The metallic shell is generally cylindrical in shape with a dish-shaped cover or partition 66 at one side or end of the cylinder and an open, interior space closed at the opposite side by the printed circuit board 44 but otherwise ventilated through the perforations in the other sides. The shell 60 is adequately perforated to permit smoke and other aerosols to enter the open interior space. A circular plate 68 is riveted to the center of the partition 66 and provides an emission surface extending generally parallel to the circuit board 44 directly opposite a corresponding emitting surface on the electrode 62. The shell is fastened to the printed circuit board 44 and is electrically connected to the cladding sections 70 on the lower side of the board by a pair of rivets 72 and 74.

The electrode 62 has a symmetric horn-shaped configuration which flares into a circular flange defining the emitting surface extending parallel to and directly opposite the plate 68. The center of the electrode, therefore, defines an aperture 80 in which the radiation source 64 is mounted on a pedestal 82. The height of the pedestal above the circuit board 44 is selected to locate the radiation source substantially in the plane of the emitting surface on the flange of the electrode. Captured between a shoulder on the pedestal 82 and the circuit board 44 is a spacer 84 which in one embodiment of the invention is a polypropylene sleeve insulating the pedestal and source 64 from the electrode 62. The bottom end of the pedestal is crushed to rivet both the pedestal 82 and the spacer 84 to the board 44. The radiation source 64 is held in place on the upper end of the pedestal by means of a crimped bead.

FIG. 6 illustrates in detail the manner in which the electrode 62 is electrically connected to the cladding sections 88 on the circuit board 44. Diametrically opposed tangs 90 and 92 extend downwardly from the central portion of the electrode 62 through slots in the printed circuit board 44 and through terminal holes in the cladding sections 88. The tangs are then soldered to the cladding to hold the electrode fastened to the board with the radiation source 64 centrally positioned within the electrode aperture 80.

Functionally, the perforated shell 60 with the plate 68 is connected to the positive pole of the battery B and the electrode 62 is connected to the negative pole. Alpha particles emitted by the radiation source 64 into the open space between the plate 68 and electrode 62 ionize the air and other molecules and produce free electrons and positive ions. The electrons gravitate toward the positively charged shell 60 and plate 68 while the positive ions move toward the negatively charged electrode 62. An ionization current thus passes between the shell and electrode.

If smoke or other aerosols enter the interior space of the sensing chamber 20, the collisions between alpha particles from the radiation source 64 and the oxygen and nitrogen molecules of the air are reduced because collisions now occur with the relatively larger and heavier combustion products and particulate matter suspended in the smoke. While ionization of the combustion products and particulate matter may also occur, the rate at which the heavier positively charged ions move toward the negatively charged electrode 62 is less than that of the nitrogen and oxygen ions, and greater neutralization of the ions before they reach the shell and electrode occurs. Reduced collisions, reduced numbers of ions and reduced speed of the heavier ions contribute to an overall reduction in the ionization current and an apparent increase in the resistance of the sensing chamber 20. It is the decreased current or increased resistance at a particular smoke level which is utilized to trigger the alarm 40.

Figure 7:
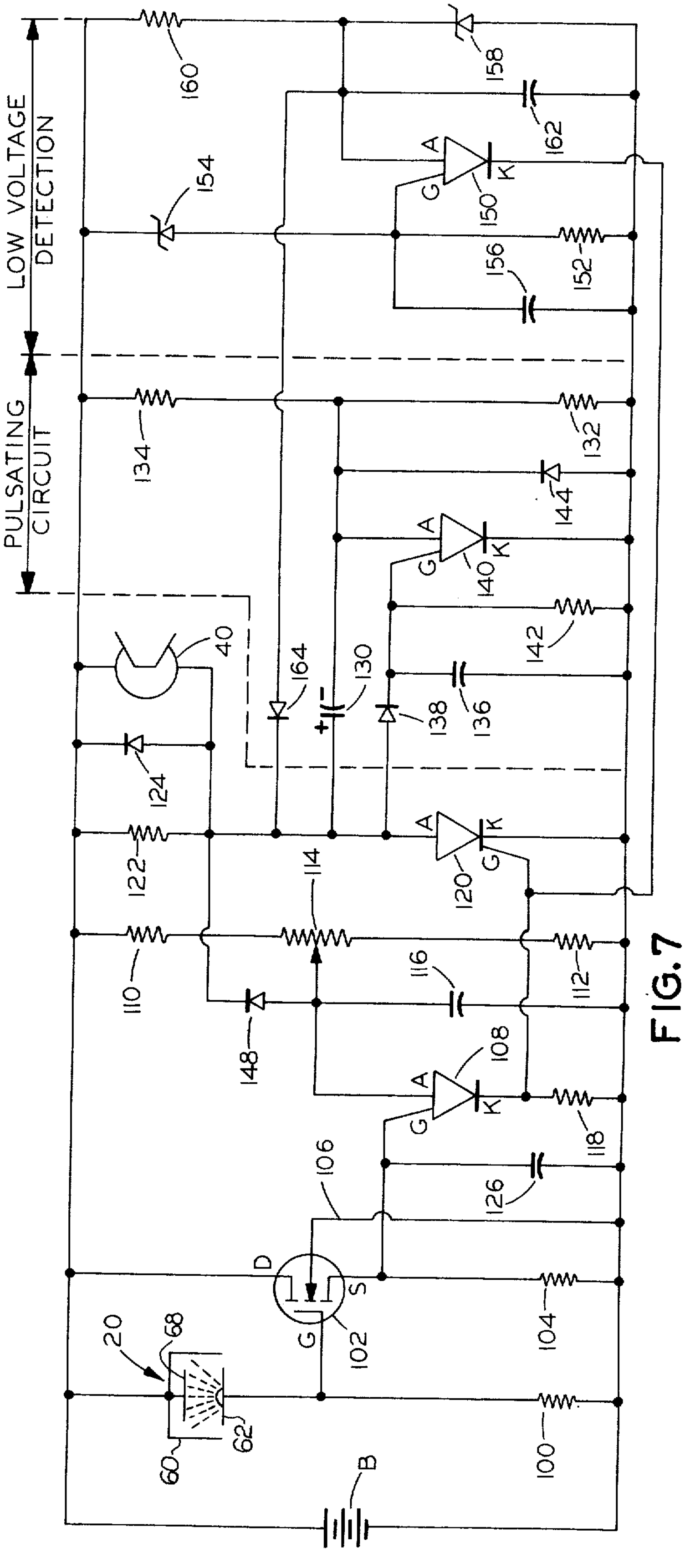
FIG. 7 is an electrical diagram of the entire detector which forms a smoke alarm system including the components of the pulsating and low voltage detection circuitry.

FIG. 7 is an electrical diagram illustrating the complete smoke alarm system including the battery B and sensing chamber 20. Illustrated at the right-hand portion of the diagram is the low-voltage detection circuitry which detects a weakening battery and triggers the alarm 40. A pulsating circuit is illustrated adjacent the low-voltage circuit and includes components allowing the alarm 40 to be turned on for limited periods of time so that a cyclic alarm signal is heard when smoke is detected or when a low-voltage battery condition is detected. The remaining portion of the electrical diagram illustrates the alarm circuit including components for coupling the sensing chamber 20 to the alarm 40 and triggering the alarm in a cyclic manner when the smoke condition exceeds a predetermined level.

The sensing chamber 20 is connected across the battery poles in series with a load resistor 100. It is also possible to utilize the present invention in a dual chamber alarm system and, in such case, the load resistor 100 is replaced by a second, mating sensing chamber which would be exposed to environmental variables, such as temperature and pressure, but not to the smoke which is to be detected. In such an installation, the second chamber compensates for various factors affecting the resistance of the chambers other than the smoke itself and, hence, a more accurate smoke-sensitive system is provided.

TRIGGERING ALARM

The electrical resistance of both the resistor 100 and the chamber 20 are approximately equal and in an exemplary case it would lie in the range of 300,000 megohms. With a 12.5 volt battery, the average voltage at the junction of the load resistor 100 and the chamber 20 is approximately 6 volts. As the apparent resistance of the chamber 20 increases due to increased smoke level, the voltage at the junction of the resistor 100 and chamber 20 may change by 1 or 2 volts and it is this change which must be detected to trigger the alarm 40. However, due to the high resistance of the chamber and load resistor, the slightest current drawn by the measuring circuit would cause undue loading and obscure the true fluctuation produced by the chamber alone. For this reason, a metal-oxide-semiconductor field-effect transistor MOSFET 102, having a very high input impedance is utilized as a coupling device between the chamber and the rest of the alarm circuitry.

The gate of the transistor 102 is, accordingly, coupled to the junction of the chamber 20 and resistor 100, the drain is connected to the positive pole of the battery and the source is connected to the negative pole of the battery through bias resistor 104. Zero bias is applied to the substrate of the transistor by the conductor 106. With the voltage levels as described, the transistor 102 is forward-biased and when the gate voltage drops due to increased resistance of the chamber 20, the source voltage follows the gate and drops correspondingly.

The source of the transistor 102 is connected to the gate of a programmable unijunction transistor 108. When the alarm 40 is off, the anode of the transistor 108 acquires a voltage determined by the resistors 110 and 112 and the potentiometer 114. A capacitor 116 is also connected to the anode of the transistor 108 in parallel with the resistor 112 and a portion of the potentiometer 114. A load resistor 118 is connected to the cathode of the transistor 108 to develop a voltage when the transistor is turned on. The cathode is connected to the gate of a silicon-controlled rectifier (SCR) 120 which is connected in series with the alarm 40 across the poles of the battery B and serves as a switching device for turning the alarm on and off. A holding resistor 122 is also connected to the SCR 120 in parallel with the alarm 40 to provide a holding current through the SCR after it is turned on. A suppressing diode 124 shunts the alarm 40 to protect the SCR 120 when the alarm is turned off.

To trigger the alarm 40 into operation when the smoke condition exceeds a predetermined level and causes the resistance of the sensing chamber 20 to increase, the voltage at the gate of the transistor 102 drops and the voltage at the source of transistor 102 and the gate of transistor 108 drops correspondingly. Transistor 108 is turned on when the offset voltage of the gate and anode forward-biases the transistor by approximately 0.6 volt. By programming the anode voltage of the transistor 108 by means of the potentiometer 114, the smoke level which turns the transistor 108 on can be adjusted. When the transistor 108 is turned on, the gate of SCR 120 receives a current pulse due to the discharging of the capacitor 116 through the transistor 108, switches the SCR into conduction and, thereby, turns the alarm 40 on. The alarm signal is, therefore, sounded as soon as the smoke level in chamber 20 reaches a predetermined value. A capacitor 126 connected to the gate of the transistor 108 eliminates spurious transients that might inadvertently turn the alarm on.

PULSATING CIRCUIT

To prevent the alarm 40 from remaining latched on if the smoke level again drops below that which triggers the alarm, or to cycle the alarm on and off in the presence of a continuing smoke condition, the pulsating circuit illustrated in FIG. 7 is provided and deactivates the alarm a fixed interval after it is turned on.

Prior to the turning on of the alarm 40, a commutating capacitor 130 is charged with the polarity illustrated primarily through resistor 122 having a relatively low resistance, the alarm 40 and a resistor 132 forming a voltage divider with resistor 134. Also, the capacitor 136 is charged in a similar manner through the diode 138. The voltage divider formed by resistors 132 and 134 is connected to the anode of a programmable unijunction transistor 140 and established a reverse-biasing offset voltage between the anode and gate connected to the capacitor 136 which biases the transistor off.

When the alarm 40 is turned on, the voltage at the anode of SCR 120 drops almost to ground potential and commutating capacitor 130 discharges through the SCR and recharges with a polarity opposite that shown through the resistor 134. At the same time, capacitor 136 discharges through a resistor 142 and begins to drop the voltage level on the gate of the programmable unijunction transistor 140. When the offset voltage between the anode and gate is approximately 0.6 volt, the transistor is forward biased and turns on. The transistor 140, thusly, discharges the commutating capacitor 130 which reverse biases SCR 120 and turns it off by blocking the holding current passing through the alarm 40 and resistor 122. The capacitor 136 then recharges and transistor 140 is turned off. The suppressing diode 144 protects the transistor from excessive reverse potentials.

It will thus be seen that the capacitor 136 and resistor 142 form a timing circuit and in conjunction with the programming resistors 132 and 134 determine the interval during which the alarm 40 remains on. At the end of that interval transistor 140 is turned on and the alarm is deactivated by the commutating capacitor 130 operating upon the SCR 120 as described above. It will be noted that the SCR 120 would be held on by the resistor 122 in the absence of the reversing voltage obtained from the capacitor 130; however, the blocking of the holding current by the capacitor converts what would otherwise be a latching circuit into a non-latching circuit and turns the alarm signal off a fixed period of time after it has been turned on.

RECYCLING ALARM

In accordance with the present invention, the alarm 40 pulsates on and off as long as the smoke level in the sensing chamber 20 is above a predetermined value set by the potentiometer 114.

Recycling of the alarm signal is accomplished by the capacitor 116 and the diode 148 coupling the capacitor to the anode of SCR 120. The capacitor is completely discharged through the diode 148 and SCR 120 when the alarm is turned on. Discharging of the capacitor 116 in this manner suppresses the voltage on the anode of transistor 108 and turns it off shortly after the alarm signal turns on. As long as the alarm 40 remains on, the coupling diode 148 holds the anode of transistor 108 close to ground potential rather than that set by the potentiometer 114 and the inoperative transistor cannot be turned on. When the SCR 120 is reverse biased by the commutating capacitor 130 and shuts the alarm 40 off, capacitor 116 recharges through the resistor 110 and potentiometer 114 to a level approaching that established by the potentiometer 114 in the quiescent state of the alarm circuitry. During the recharging of the capacitor 116, the offset voltage of the gate and anode of transistor 108 changes the transistor from a reversed biased condition to a forward biased condition. When the offset is approximately 0.6 volt, the transistor again conducts and triggers SCR 120 to actuate alarm 40. The pulsating circuit repeats its deactuating function and the alarm recycles through the on-off signal pattern as long as the smoke level detected by the chamber 20 persists. If for any reason the smoke condition ceases due, for example, to the extinguishing of a fire producing the smoke, the alarm 40 stops the cyclic signaling and the alarm circuit reverts to its quiescent state which existed prior to the detection of the smoke condition.

It should also be noted that the repetition rate of the cycling alarm signal increases with increased smoke levels and, therefore, indicates a greater urgency to individuals hearing the alarm signal. The increased repetition rate results because the increased smoke level increases the resistance of the sensing chamber 20 and suppresses the voltage on the gates of the transistor 102 and transistor 108. As a consequence, the voltage to which capacitor 116 must charge in order to reach the offset voltage needed to forward bias transistor 108 is lower and, therefore, the charging period or off-interval between alarm signals is reduced.

LOW VOLTAGE DETECTION CIRCUIT

The operation of the smoke detector from a battery source is particularly desirable since it allows the detector to be installed at locations remote from existing electrical power outlets. At the same time, however, the limited useful life of the battery could be a hazard and result in a failure of the detector at a most crucial time. In accordance with the present invention, therefore, the low voltage detection circuitry illustrated in FIG. 7 is connected in parallel with the circuitry coupled to the sensing chamber 20 to sound the alarm 40 and indicate that the end of the useful battery life is approaching.

The low voltage detection circuitry includes a programmable unijunction transistor 150 having a cathode connected directly to the SCR 120 for turning the alarm on. The gate of the transistor 150 is connected to the output of a voltage divider which is connected across the poles of the battery B and which is formed by a resistor 152 and a reverse-biased zener diode 154. The voltage divider is rendered insensitive to transient fluctuations in the battery output by capacitor 156.

The anode of the transistor 150 is also connected to a voltage divider which is connected across the poles of battery B and which is formed by a reverse-biased zener diode 158 and a resistor 160. It will be observed that the resistor 152 is connected between the gate of the transistor 150 and the negative pole of the battery while the diode 154 is connected between the gate and the positive pole of the battery. The diode 158 is connected between the anode of the transistor and the negative pole of the battery and the resistor 160 is connected between the anode and the positive pole of the battery.

In the low voltage detection circuit the transistor 150 compares the voltage on the gate representative of the battery potential with a reference voltage on the anode. By appropriate selection of the zener diodes 154 and 158, the voltage levels at the gate and anode of transistor 150 reverse bias the transistor when the output voltage of the battery is high and the battery is new. As the battery ages, however, the output voltage declines, and the voltage on the gate of the transistor 150 is decreased relative to the reference voltage on the anode due to the positions of the diodes 154 and 158 in the two voltage dividers. In particular, the diode 154 sets the gate of the transistor at a voltage level which is a fixed differential below the waning battery voltage while the diode 158 programs the anode at a zener voltage level above ground, for example 8 volts or something less than the full battery potential. The gate voltage, therefore, follows the battery voltage while the anode is set at a reference value determined by zener diode 158.

As the end of the useful battery life is approached and the battery voltage depreciates, a point is reached when the voltage offset of the gate and anode forwardly biases the transistor 150 into conduction. A capacitor 162 connected in parallel with the zener diode 158 and previously charged to the zener voltage through resistor 160 discharges at least partially through the transistor 150, the resistor 118 and the gate of SCR 120 to turn the SCR 120 and the alarm 40 on. In this respect, the capacitor 162 is identical to the capacitor 116 in functional operation. When the alarm is turned on, the capacitor 162 completely discharges through the diode 164 and the SCR 120 and suppresses the voltage on the anode of transistor 150 to turn the transistor off.

With the alarm 40 turned on, the pulsating circuitry including the timing capacitor 136 and resistor 142 begins to operate as described above in connection with smoke detection and shuts the alarm 40 off when the commutating capacitor 130 blocks the holding current through the SCR 120. Recycling of the alarm signal continues when the capacitor 162 recharges through resistor 160 to the voltage producing the gate-to-anode offset that forwardly biases the transistor 150 into conduction. To preserve what remaining life there may be in the battery and to provide a battery warning signal distinctly different from that due to a fire or other smoke condition, the time constant of the charging resistor 160 and capacitor 162 is made substantially larger than the time constant of the capacitor 116 and resistor 110, 114 network for smoke alarm signals. Accordingly, the repetition rate for a low-battery voltage condition is much lower than the repetition rate for a smoke condition due to the longer interval between alarm sounds.

The ionization smoke detector and the non-latching, pulsating alarm system described above have particular utility in residential environments since they operate from a battery source with safety, reliability and no maintenance over extended periods of time. The radiation source 64 is adequate to operate the sensing chamber at sensitivity levels suitable for smoke detection but, at the same time, does not produce radiation which is hazardous to human beings in the adjacent vicinity. The safety features provided by the low voltage detection circuitry inform a user of the limited residual life of the battery before operation of the alarm 40 is no longer possible. The pulsating circuit also conserves battery strength when an unsafe smoke level has been sensed.

While the present invention has been described in a preferred embodiment, it should be understood that modifications and substitutions to the detailed structure can be had without departing from the spirit of the invention. For example, the locking arrangement between the base 14 and cover 16 illustrated in FIG. 4 can be replaced by auxiliary fasteners or threading between the two portions of the housing 12. The shape of the detector 10 and the mounting of the components within the detector may be varied correspondingly although the positioning of the sensing chamber 20 on the printed circuit board bearing the alarm circuitry is particularly useful in obtaining a compact assembly. The design of the sensing chamber may be varied, for example, by molding the perforated shell from an insulating material and supporting an electrically conductive element within the shell opposite the electrode to serve as the anode in place of the metallic shell. The conductive element could be a plate, such as the plate 68, or a plating on the interior of the shell. The specific components in the detection circuitry may be varied although the programmable unijunction transistors provide flexibility in designing the circuitry for different operating values and the use of a single SCR and pulsating circuit for operating the alarm in response to both smoke and low battery voltages contributes to the economies of manufacturing a smoke detector suitable for residential use. Accordingly, the present invention has been described in a preferred embodiment by way of illustration rather than limitation.

We claim:

1. An ionization smoke detector having a sensing chamber comprised of:

a mounting board;

a perforated metallic shell defining an open interior space and supported at one side on the mounting board with the one side and the board in adjacent relationship;

an electrode mounted on the board and positioned within the open interior space of the metallic shell adjacent the one side in electrically insulated relationship to the metallic shell, the electrode having a surface facing away from the board and toward the side of the shell opposite the one side and defining an aperture in the middle of the surface; and a radiation source supported from the mounting board in the aperture of the electrode for exposure within the interior space of the shell.

2. An ionization smoke detector having a sensing chamber as defined in claim 1 wherein the radiation source is electrically isolated from the metallic shell and the electrode.

3. An ionization smoke detector as in claim 1 wherein:

the radiation source is supported in the aperture close to the plane of said surface of the electrode.

4. An ionization smoke detector having a chamber as defined in claim 1 wherein:

a pedestal is connected to the mounting board and extends into the aperture of the electrode; and the radiation source is mounted on the pedestal.

5. The ionization smoke detector of claim 4 further including:

an insulating spacer interposed between the pedestal and the portion of the electrode defining the aperture to electrically isolate the pedestal and source from the electrode.

6. The ionization smoke detector having a sensing chamber as defined in claim 1 wherein:

the mounting board is a printed circuit board having electrical conductors defined in cladding on one side of the board; and the metallic shell and the electrode are electrically connected to different conductors in the cladding of the board.

7. The ionization smoke detector of claim 6 wherein:

the metallic shell and the electrode are mounted on the side of printed circuit board opposite that bearing the conductors to which the shell and electrode are electrically connected.

8. An ionization smoke detector having a sensing chamber comprising:

a platform;

a porous shell mounted on the platform and defining an interior chamber space ventilated through the walls of the shell;

an electrode mounted within the chamber space defined by the shell;

a radioactive source mounted near the center of the electrode in electrically insulated relationship to the electrode; and an electrically conductive element supported by the porous shell in the chamber space at another side of the space separated from said one side.

9. An ionization smoke detector as in claim 8 wherein the conductive element is formed by an electrically conductive plating on the interior of the shell.

10. An ionization smoke detector as in claim 8 wherein the conductive element is a plate supported within the shell.

11. A housing for an ionization smoke detector having a ventilated sensing chamber comprising:

a base portion having a bottom and a sloped, peripheral wall containing a plurality of apertures and diverging away from the bottom; and a cover portion engaged with the base portion and having a concave outer surface disposed generally parallel to the bottom of the base portion, the cover portion also defining a central aperture circumscribed by the concave surface and exposing the ventilated sensing chamber.

12. A housing for a battery-operated ionization smoke detector as defined in claim 11 wherein:

the base portion has a molded bottom; and a battery holder is integrally molded into the bottom of the base portion.

13. A housing as defined in claim 12 wherein:

the battery holder is a resilient battery holder molded integrally in the bottom.

* * * * *